United States Patent
Serenkin

[11] Patent Number: 6,109,425
[45] Date of Patent: Aug. 29, 2000

[54] DRAG TYPE CONVEYOR SYSTEM AND METHOD

[75] Inventor: Arnold B. Serenkin, Simsbury, Conn.

[73] Assignee: National Conveyors Company, East Granby, Conn.

[21] Appl. No.: 09/125,736

[22] PCT Filed: Feb. 17, 1998

[86] PCT No.: PCT/US98/01446

§ 371 Date: Dec. 9, 1998

§ 102(e) Date: Dec. 9, 1998

[87] PCT Pub. No.: WO98/32678

PCT Pub. Date: Jul. 30, 1998

[51] Int. Cl.[7] .................................................. B65G 19/18
[52] U.S. Cl. ..................................... 198/735.4; 198/860.4
[58] Field of Search .................................. 198/528, 530, 198/531, 532, 735.4, 860.4, 861.1

[56] References Cited

U.S. PATENT DOCUMENTS

| | | |
|---|---|---|
| 489,289 | 1/1893 | Dodge . |
| 1,358,061 | 11/1920 | Davidson et al. . |
| 1,401,155 | 12/1921 | Jacoby . |
| 1,944,963 | 1/1934 | Bradford et al. ............................ 73/21 |
| 2,627,336 | 2/1953 | Lordis ...................................... 198/530 |
| 2,642,980 | 6/1953 | Soucek ...................................... 198/66 |
| 2,650,693 | 9/1953 | King .......................................... 198/57 |
| 3,031,064 | 4/1962 | Kline ......................................... 198/66 |
| 3,105,586 | 10/1963 | Carew et al. ............................... 198/64 |
| 3,216,464 | 11/1965 | Horst ........................................... 141/9 |
| 3,279,592 | 10/1966 | Kerkvliet ................................... 198/215 |
| 3,351,180 | 11/1967 | Herzog et al. .................... 198/860.4 X |
| 3,522,735 | 8/1970 | O'Brien ...................................... 73/421 |
| 3,570,666 | 3/1971 | Delcellier ................................... 209/74 |
| 3,828,919 | 8/1974 | Holtsclaw et al. ........................ 198/160 |
| 3,938,649 | 2/1976 | Bell et al. ................................... 198/38 |
| 4,023,673 | 5/1977 | Hansen ................................. 198/530 X |
| 4,058,199 | 11/1977 | Schlagel ................................... 198/370 |
| 4,147,557 | 4/1979 | Mayo ......................................... 127/6 |
| 4,201,287 | 5/1980 | Straub et al. ............................. 198/530 |
| 4,250,987 | 2/1981 | Trammell et al. ....................... 198/530 |
| 4,378,063 | 3/1983 | Silverthorn .......................... 198/735.4 |
| 4,471,868 | 9/1984 | Buschbom et al. ..................... 198/735 |
| 4,842,128 | 6/1989 | Tomlinson .............................. 198/735 |
| 5,526,920 | 6/1996 | Ellsworth ......................... 198/860.4 X |

FOREIGN PATENT DOCUMENTS

1023407  1/1958  Germany ............................... 198/530

*Primary Examiner*—James R. Bidwell
*Attorney, Agent, or Firm*—Alix, Yale & Ristas, LLP

[57] ABSTRACT

A discharge station for a drag type conveyor system (10) includes a pair of spaced side rails (18, 20) and a series of elongated bottom panels (24) extending transversely of the rails. The bottom panels of the station are capable of lateral movement to adjustably define individual discharge openings (26) of selected size and configuration for each panel length. The particulate material (14) then is drawn along the successive panels to effect controlled uniform discharge of the particulate material through the discharge openings.

11 Claims, 8 Drawing Sheets

DRAG TYPE CONVEYOR SYSTEM AND METHOD

This is the national phase of International Application No. PCT/US98/01446 filed Feb. 17, 1998.

FIELD OF THE INVENTION

The present invention relates generally to conveyor systems and is more particularly concerned with a new and improved drag conveyor system, especially the discharge station thereof.

BACKGROUND OF THE INVENTION

Bulk materials, such as ores, minerals, metal chips and other particulates, are often delivered to transport vehicles or deposited in stockpiles with the use of various types of mechanical conveyors. One such type of mechanical conveyor is the drag conveyor.

A drag conveyor consists of a rectangular U-shaped outer casing and an inner heavy duty single or double strand continuous chain assembly having plow blades or panels, sometimes known as drag flights, rigidly secured thereto for movement with the chain relative to the outer casing. The continuous chain assembly is driven by a mechanical drive sprocket which forms part of a powered mechanical drive unit. Idler sprockets also are provided, thereby permitting continuous forward movement of the chain and plow assembly and return or recycling thereof in a continuous loop.

Such drag flight conveyors are used to convey bulk material along both horizontal and inclined paths. The bulk materials are loaded into the conveyor at one or more feed or loading stations, generally located near the beginning part of the conveyor. As such feed material is deposited within the conveyor it accumulates between plows or drag flights and is drawn forward along the bottom surface of the conveyor casing towards the discharge station of the conveyor.

One common application of such drag type conveyors is for the delivery of bulk material to waiting rail cars, truck trailers, barges, storage piles and other containers. In such applications, the conveyor is typically loaded at or near ground level or plant floor level after which the conveyor makes a transition from the horizontal, rising at an incline generally less than 90° to a higher elevation at which point the conveyor path changes to horizontal once again as it continues to a terminal point over the top of transport vehicles which are to be loaded.

Discharge stations used heretofore for discharging bulk particulate materials from a drag type conveyor have included chutes of various configurations as well as fixed openings which have been cut into the conveyor bottom pan at spaced intervals therealong and slide gates fitted to the conveyor bottom and movable between either a fully closed position or a fully open position. In actual practice, none of these provides a uniform deposition of material within a waiting container, trailer or stockpile. Irregular deposition occurs and this circumstance can result in a poor load distribution within the container resulting in wasted space and lower cost effectiveness.

A disadvantage associated with the use of slide gates and chutes is the requirement that such gates and chutes be frequently repositioned to provide distribution of material over the full length of a container or stockpile. Another disadvantage with mechanical slide gates and chutes is the costly abrasive wear and maintenance associated with such repositioning.

When discharge chutes are fitted to the bottom of a drag type conveyor, the overall height of the conveyor installation must accommodate both conveyor height and chute height, resulting in a conveyor support structure or building structure of a height which is appreciably higher and more costly than needed for the loading operation.

In those installations where fixed openings of triangular, rectangular or other designs are provided in the conveyor bottom plate, very irregular discharge often occurs. This undesirable circumstance occurs because as bulk solid materials are dragged forward across openings in the conveyor bottom resulting in the gradual discharge of material, the angle of repose of such material is constantly being altered, thereby affecting its free flow discharge behavior. Owing to variations in particle size, shape and moisture content, it is impossible to select a particular pattern of fixed slot openings in the conveyor bottom which will at all times result in the desired uniform discharge. Moreover, if the same conveyor is to be used for the conveyance and discharge of markedly different types of material, such as both coal and cast iron chips, it is highly unlikely that a pattern of fixed discharge openings which might work reasonably well for one material will be suitable for uniformly unloading the second material due to the difference in free flow characteristics exhibited by the different materials.

Another major shortcoming associated with the use of an overhead drag type conveyor having a fixed number of discharge sections, each having discharge outlets having fixed dimensions, is the fact that trucks or containers of different lengths cannot be accommodated. For example, if an overhead drag conveyor is set up with three fixed discharge outlets arranged to deposit materials into trailers of only one length, such as a 28 foot long trailer, these fixed outlets would be inadequate for properly loading a longer trailer, such as a 45–50 foot long trailer.

SUMMARY OF THE INVENTION

Accordingly, it is an object of the present invention to provide a new and improved overhead drag conveyor having one or more discharge stations that may be controllably positioned either (a) in a closed position allowing no discharge or (b) alternatively, in one of a large number of different configurations and sizes to optimize the discharge of a particular bulk material and delivery of same to truck trailers, other containers or stockpiles.

Another object of the present invention is to provide an overhead drag conveyor system that effects a controlled and uniform discharge distribution along the length of a material receiving collector such as a trailer, container or stockpile. This is achieved without the necessity for frequent repositioning or height adjustment of chutes and gates.

Yet another object of the present invention is to provide a multi-panel discharge station for a drag conveyor that can be quickly and easily reconfigured to accommodate the particle size, shape and moisture content of the material being conveyed to assure a desired uniform discharge thereof. Included herein is the provision for ready and facile adaptability to differences in free flow characteristics exhibited by different conveyed materials.

A further object of the present invention is to provide a new and improved overhead drag conveyor system having a discharge station that is adaptable and adjustable to truck trailers, other containers or stockpiles having substantially different lengths ranging from about 10 feet to about 50 feet or more, while at all times providing a uniform distribution of materials within the container.

A still further object of the present invention is the provision for a method of conveying and discharging bulk particulate materials to provide a uniform or symmetrical discharge of the materials from a drag type conveyor's discharge station or stations. Included in this object is the provision for controlling the discharge to provide, when desired a controlled nonuniform or asymmetrical discharge in a predetermined pattern. The pattern may be continuous along the length of the conveyor or interrupted or distributed over a range of discharge locations along the length of the conveyor.

These and related objects are obtained in accordance with the present invention by providing a discharge station for a drag type conveyor system comprising a pair of spaced side rails and at least one elongated bottom panel extending transversely of the rails. The bottom panel of the station is capable of lateral movement to adjustably define a discharge opening of selected size and configuration between the rails. A series of such movable bottom panels may be positioned along the length of the station.

The invention also includes a method of controlling discharge flow from a discharge station for a drag type conveyor system for particulate material comprising the steps of providing series of elongated discharge control panels along the bottom of the conveyor within the discharge station, selectively laterally moving each panel to adjustably define individual discharge openings of selected size and configuration for each panel length and drawing the particulate material along the successive panels to effect controlled uniform discharge of the particulate material through the discharge openings.

Other objects will be in part obvious and in part pointed out more in detail hereinafter.

A better understanding of the objects, advantages, features, properties and relationships of the invention will be obtained from the following detailed description and accompanying drawings which set forth an illustrative embodiment and is indicative of the way in which the principles of the invention are employed.

DESCRIPTION OF A PREFERRED EMBODIMENT

Figure 1:
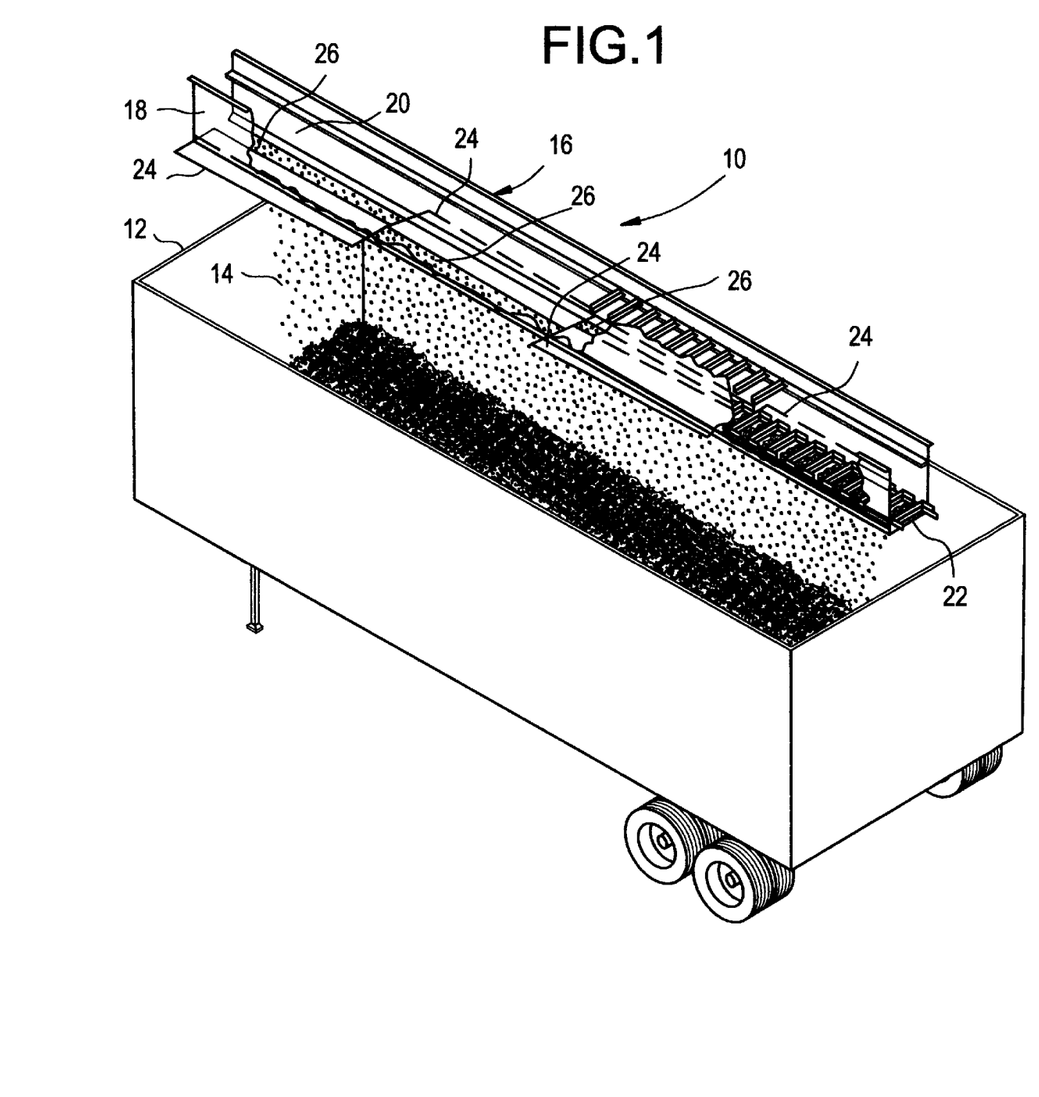
FIG. 1 is a perspective view, partially broken away, schematically showing the discharge station area of a drag conveyor discharging bulk particulate material into the container bed of a trailer.
Figure 3:
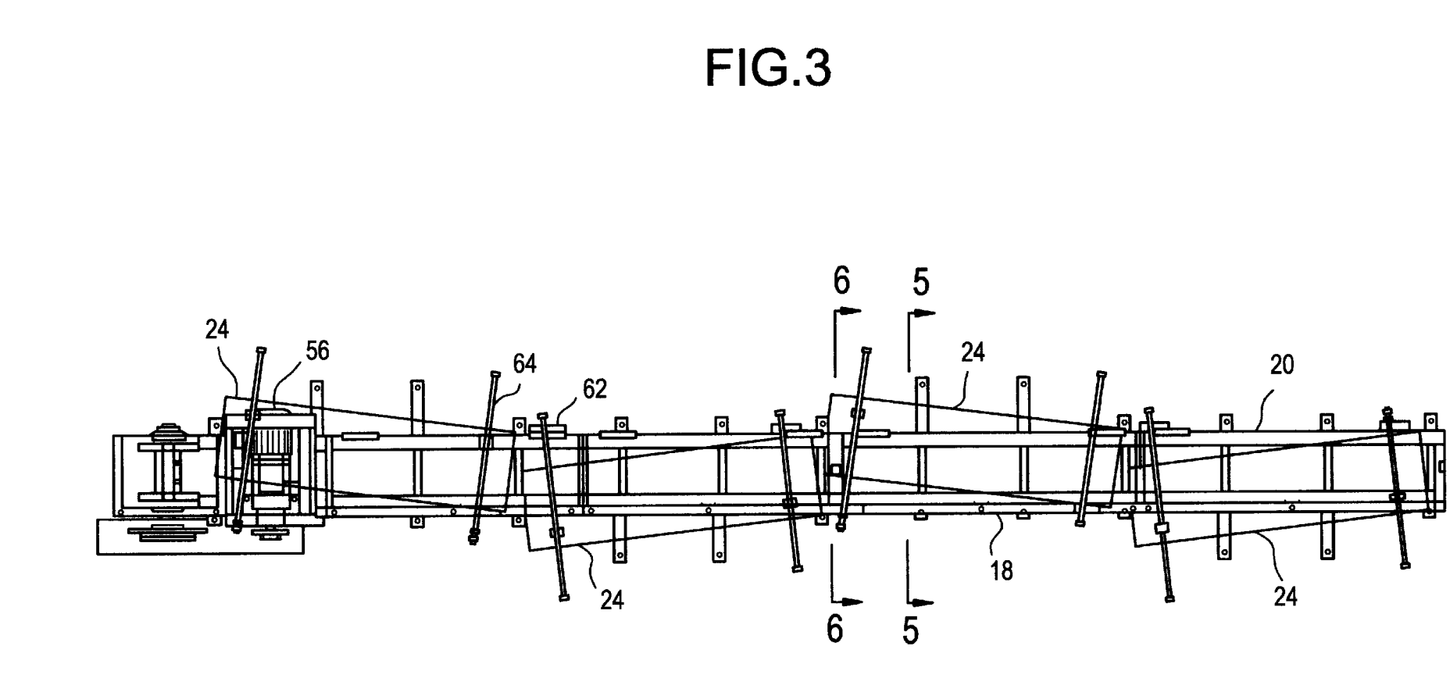
FIG. 3 is a top plan view of a multi-sectional discharge station area in accordance with the present invention showing a conveyor drive and an illustrative discharge configuration for the multiple discharge panels.

Referring now to the drawings in greater detail wherein like reference numerals indicate like parts throughout the several figures, a discharge station for a drag flight conveyor is shown schematically in FIG. 1 with an overhead conveyor section 10 below which is positioned an elongated trailer bed or compartment 12 into which bulk materials 14 can be deposited from the conveyor. The conveyor section 10 comprises a casing 16 of generally U-shaped cross-sectional configuration and consists of a pair of elongated side rails 18, 20 of generally rectangular configuration arranged in spaced parallel relationship and a base or floor 22 extending between the side rails 18, 20 at the bottom edges thereof. As best shown in FIGS. 1 and 3, the conveyor floor 22 consists of a series of flat movable panels 24 arranged end-to-end longitudinally along the length of the discharge station. In accordance with the invention, each of the panels articulates laterally of the side rails to define a discharge opening 26 between one of the side rails and the longitudinal edge of the floor panel 24. The side rails are rigidly secured in a spaced parallel relationship by means of upper and lower transverse spacer bars 28, see FIG. 5, that extend therebetween.

Spaced at intervals along the length of the rails are a series of fixed lower support brackets 32, 34 that extend outwardly from and are secured to the side rails 18, 20, respectively, adjacent the bottom edges thereof. These are effective for supporting a series of clamping and retaining bars 36 that bear against the bottom panels 24 for securing them in position relative to the side rails. The retaining bars 36 are positioned below the bottom panels 24 of the casing 16 and extend well beyond the exterior face of the side rails. The number of support brackets and associated retaining bars will of course vary with the length of the bottom panels in order to provide an appropriate supporting and clamping action along the full length of the panels.

Figure 5:
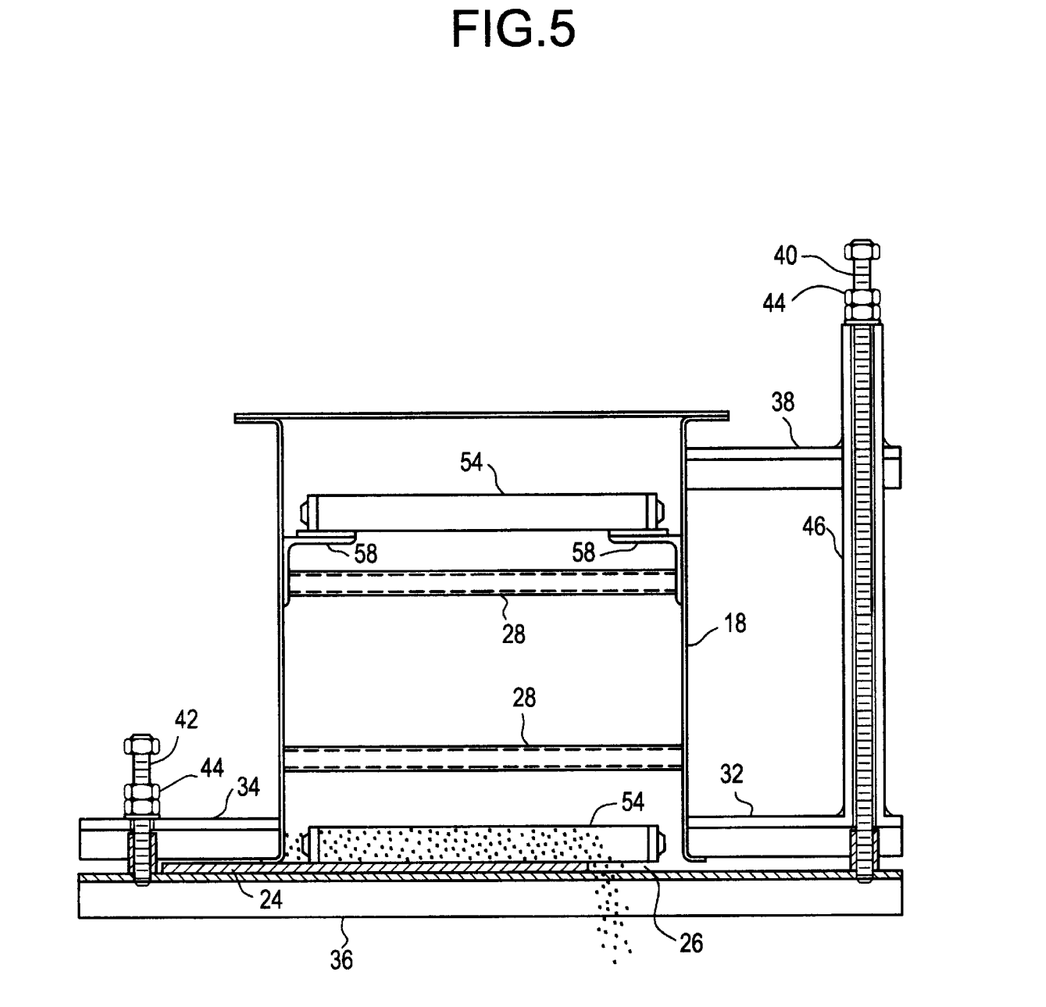
FIG. 5 is a sectional view taken along the line 5—5 of FIG. 3.

As shown in FIG. 5, in addition to the lower support brackets 32, 34 secured to the side rails adjacent the bottom edges thereof, an aligned upper support bracket 38 may be used to accommodate an elongated adjustment rod 40 for adjusting the position of the retaining bar 36 beneath the bottom panel 24. On the side where only a lower support bracket 34 is provided, a short threaded mounting and adjustment rod 42 is secured to the retaining bar 36 and extends through an aperture in the support bracket 34 where it is adjustably retained by the lock nuts 44. On the side where upper and lower brackets 38, 32 are provided, an elongated sleeve 46 extends between the brackets and encloses the similar but substantially longer threaded bolt 40 that adjustably supports the opposite end of the retaining bar 36 and facilitates raising and lowering of the bar to clamp the bar against the panel for retaining it in its adjusted position.

Figure 2:
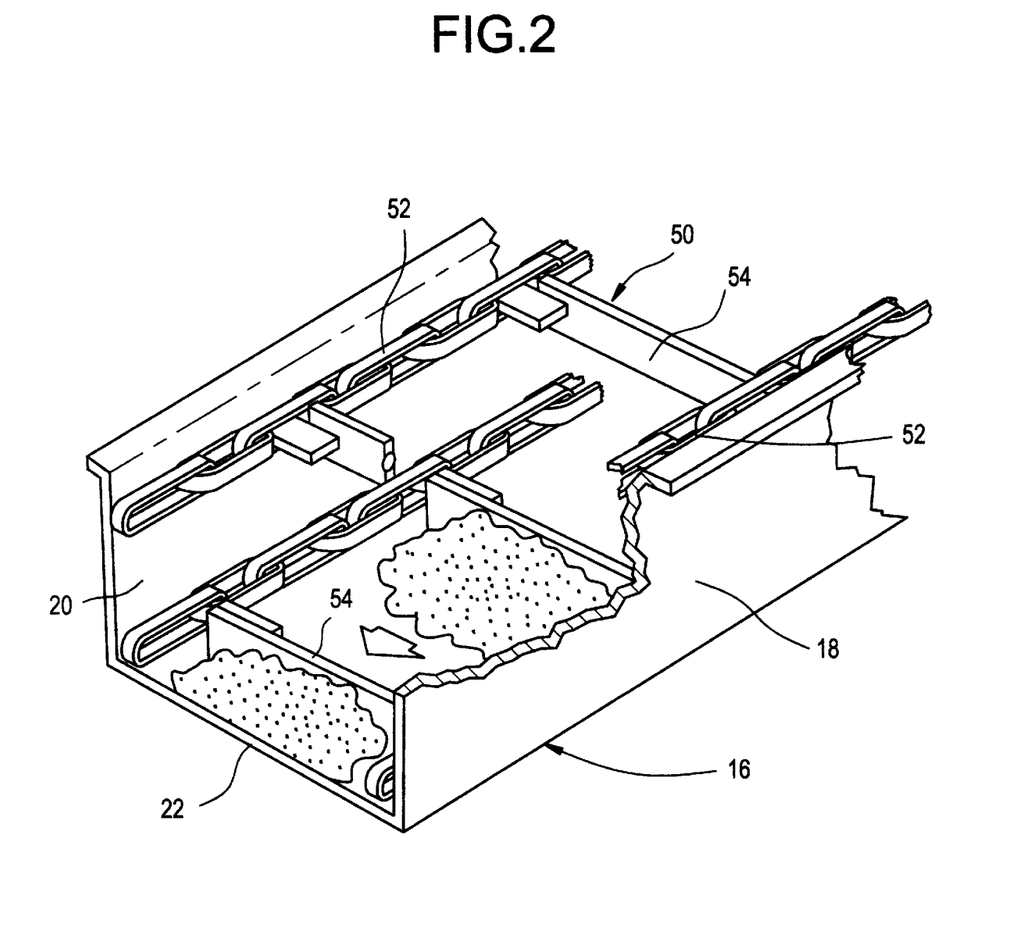
FIG. 2 is an enlarged perspective view of a portion of a drag conveyor, partially broken away and partially in section.

A circulating, multiple plow conveyor 50 is positioned within the conveyor casing 16 defined by the side walls 18, 20 and bottom panels 24 of the casing. The multiple plow conveyor 50 is of typical or conventional construction and consists of a single centrally located drive chain or, as best shown in FIG. 2, a pair of drive chains 52 positioned adjacent opposite interior faces of side rails. Each chain forms a continuous linked loop with a series of spaced plow blades 54 fixed on opposite ends to the chain at appropriately staggered intervals therealong. As shown in FIG. 3, a drive motor 56 is provided at the free terminal end of the conveyor casing 16 and is suitably connected to the chain by sprockets or other conventional means (not shown) to provide appropriate driving action whereby the chain will draw the plow blades 54 along the top surface of the bottom panels 24 to move the bulk particulate material therealong toward a discharge point. The interior walls of the side rails are further provided with elevated return rails 58 extending along the lengths thereof. The return rails 58 are positioned below the top surface of the side rails so that the plow blades 54 remain fully within the conveyor casing 16, but well above the material being drawn along the casing floor. As will be appreciated, alternative drive chain configurations may be employed without departing from the spirit of the present invention.

As mentioned, according to the present invention, a series of laterally movable bottom panels 24 form the bottom surface of the conveyor casing 16 and are movable sideways to provide discharge openings 26 of selected size and configuration. This is achieved by employing one or more actuating systems for each panel. These systems can be manually, electrically, mechanically, pneumatically or hydraulically actuated to control the size and configuration of the discharge opening 26. Thus, the manner of moving the individual bottom plates to provide the appropriate discharge opening configurations along the length of the conveyor can vary significantly and can be appropriately controlled and configured from a remote location in a preprogrammed manner.

Figure 4:
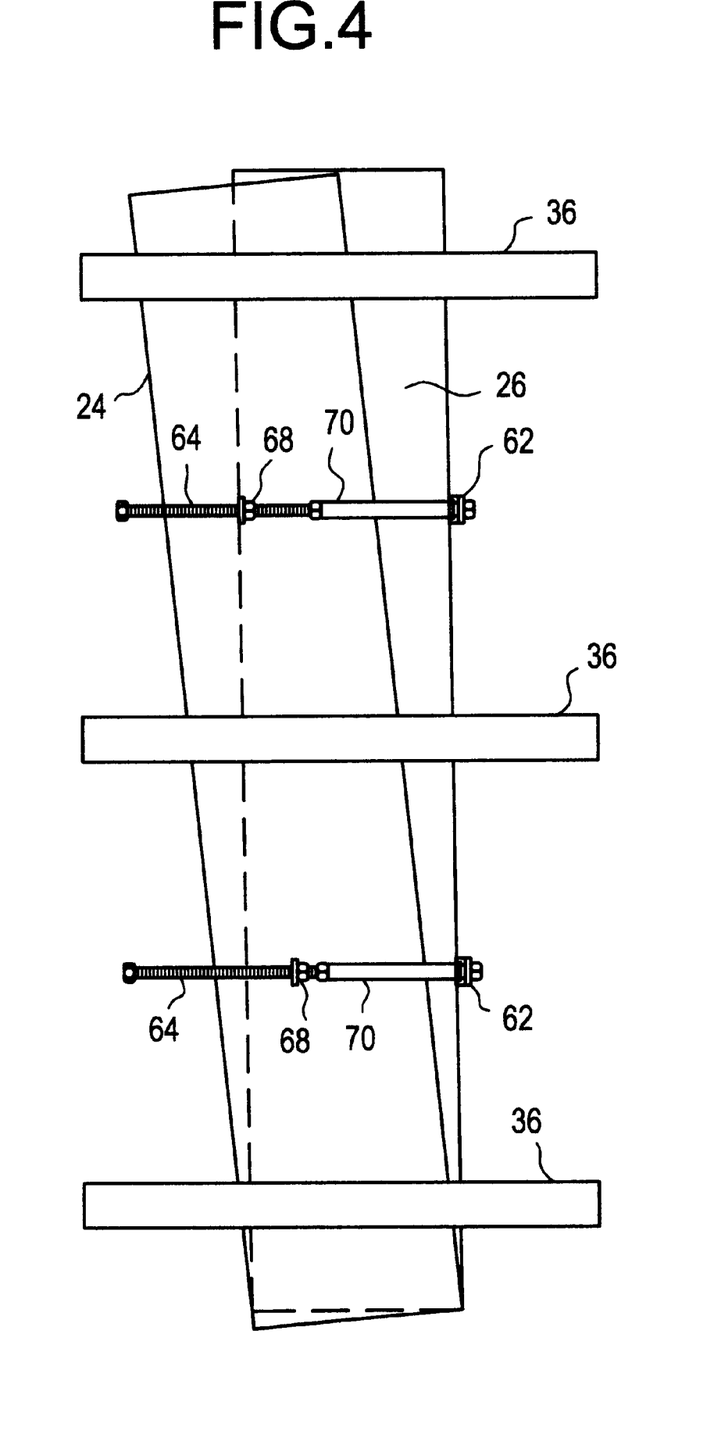
FIG. 4 is a bottom plan view schematically showing a single adjustable bottom panel of the discharge station and a portion of the actuating or adjusting mechanism for that panel.
Figure 6:
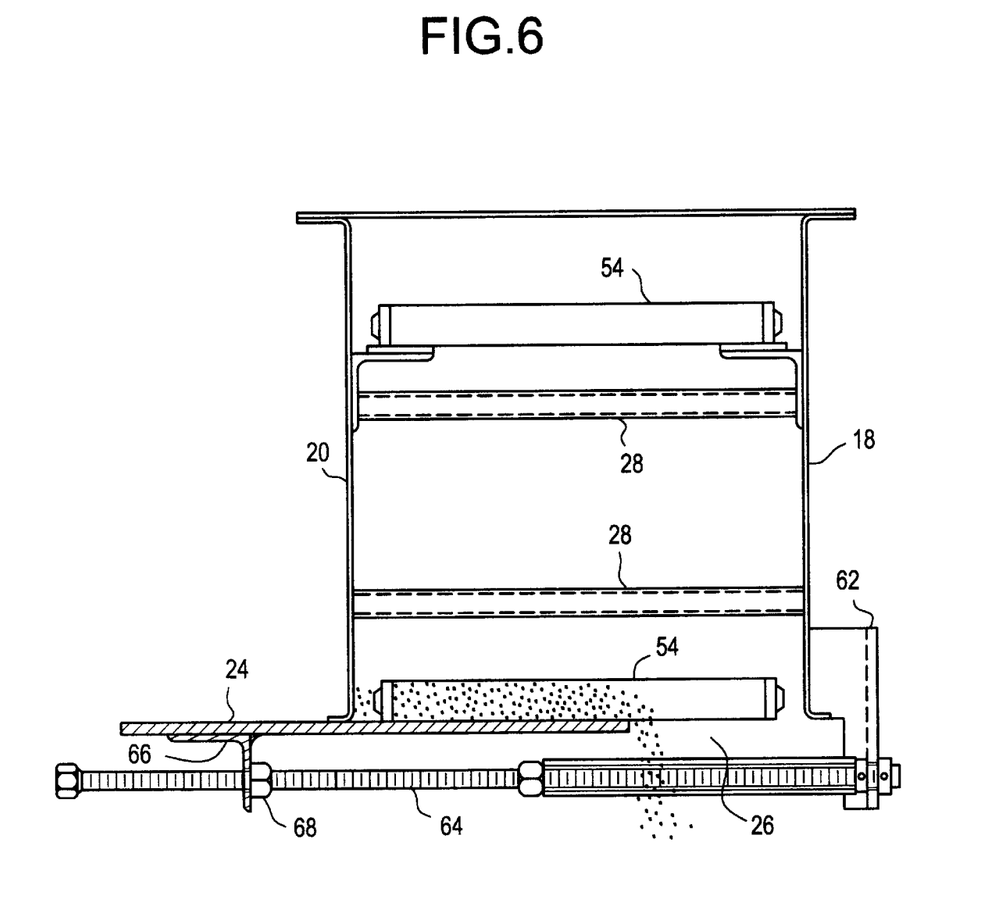
FIG. 6 is a sectional view taken along the line 6—6 of FIG. 3.
Figure 7A:
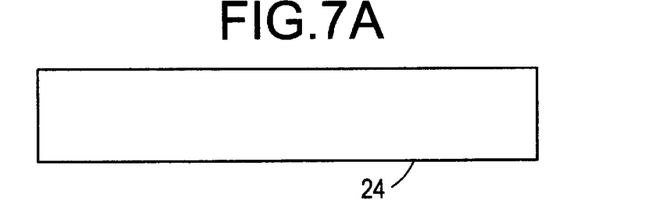
FIGS. 7a–e are a series of bottom plan views showing different positions of a single adjustable panel at the discharge station.
Figure 7B:
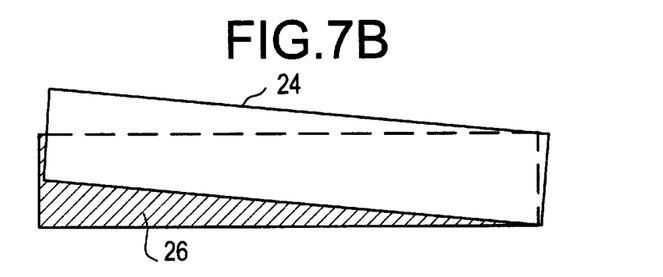
Figure 7C:
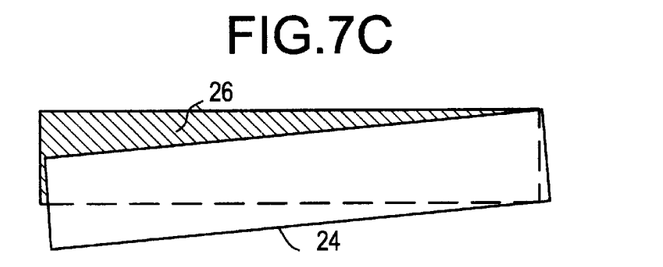
Figure 7D:
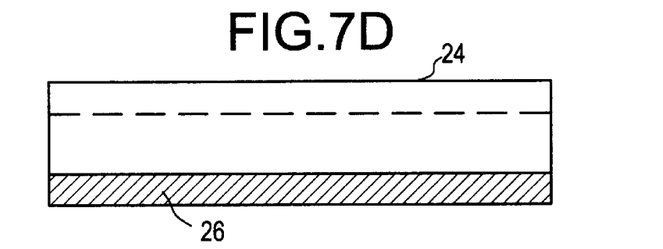
Figure 7E:
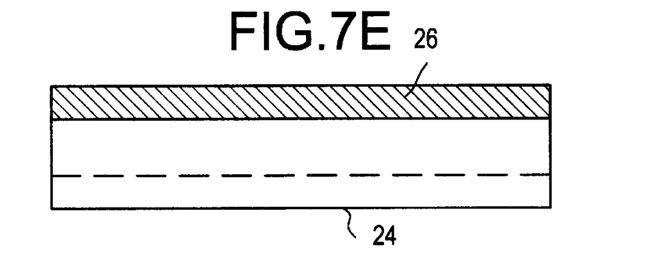

In the specific embodiment illustrated in FIG. 6, side rail 18 is provided with a fixed depending support bracket 62 to which is rotatably secured a panel actuating rod 64. A traveling rod support 66 fixed to the lower surface of the panel 24 is provided with a fixed nut member 68 threadably positioned at an intermediate location along the length of the threaded actuating rod 64 so that as the rod is rotated, the nut 68 and associated support 66 and bottom plate 24 will move laterally relative to the fixed walls of the casing. As shown in FIG. 4, two or more such indexing mechanisms are typically provided for each panel member which can vary in length typically from six to fifteen feet. As will be appreciated, the length of each panel and the number of such panels mounted end to end within the discharge station of the conveyor may vary significantly depending upon the particular installation. Additionally, it will be appreciated that when, as shown in FIG. 3, the panel 24 moves in an opposite direction from that shown in FIG. 6 toward its open position, the actuating mechanism will be reversed and the stationary support bracket 62 will be secured to the opposite side rail.

FIG. 7*a–e* provide an illustration of some of the various discharge opening configurations that may be employed along the length of the discharge station. For example, a panel 24 may be retained in its fully closed position shown in FIG. 7*a* to prevent the discharge of any material along the length thereof, or one or both ends of the panel may be moved to provide a triangular, rectangular or other discharge opening configuration.

The discharge system of the present invention can be adjusted in a rapid and simple manner by initially loosening the clamping bars bearing against the adjustable panels 24. This is readily achieved by lowering rod 40 or rod 42 or both relative to their locking nuts 44. Then an appropriate discharge opening is provided by simply moving each bottom plate to provide the appropriate opening configuration and size. This is achieved by rotating the actuating rod 64 so that the movable rod support 66 and the panel 24 secured thereto is driven either toward or away from the fixed bracket 62. As shown, the threaded actuating rod 64 may be provided with a suitable sleeve or covering 70 to protect the rod from the particles being discharged by the overlying opening that results from movement of the panel. Thus, simple rotation of the actuating rods 64 permits the movable panels 24 to be moved into innumerable configurations so as to provide a diverse and wide range of conveyor discharge openings. This of course will accommodate the different flow characteristics for the wide range of materials fed by the conveyor system.

Figure 8A:
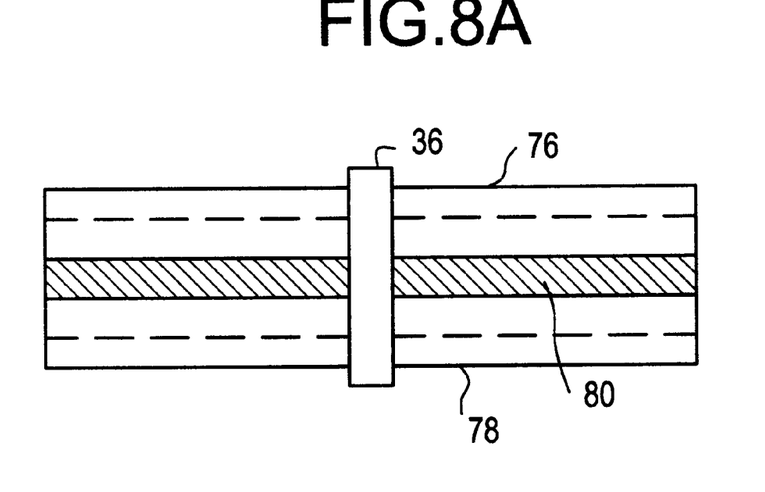
FIG. 8a–b are views similar to FIG. 7 showing different positions of another embodiment of an adjustable panel at the discharge station.
Figure 8B:
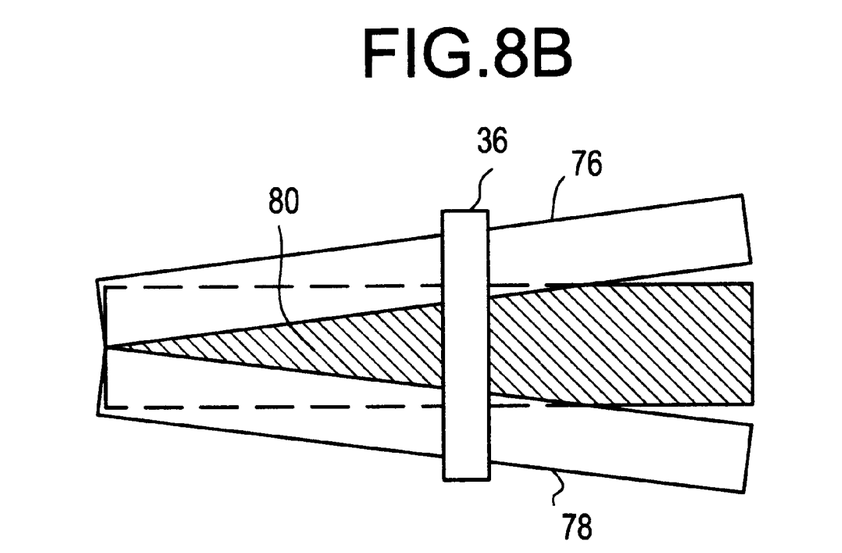

As shown in FIGS. 8*a–b*, the movable panels can take the form of a pair of side by side plates 76, 78 rather than the single panels 24 mentioned hereinbefore. In this configuration, the bottom of the conveyor casing is provided with a longitudinally extending central discharge opening 80 resulting from the lateral movement of one or more of the two plates 76, 78. Either a single actuating rod can be employed to move both plates or separate actuating rods can be provided for each plate member. Preferably the single rod is used so as to actuate both plates simultaneously to provide the desired central triangular or rectangular discharge opening. As can be appreciated, the use of plates reduces the amount of room on each side of the conveyor casing that must be used to achieve the desired discharge opening size and configuration. Substantial variations in the size and shape of the central discharge opening can be achieved in this manner.

As will be apparent to persons skilled in the art, various modifications and adaptations of the structure above described will become readily apparent without departure from the spirit and scope of the invention.

I claim:

1. An elongated discharge station for an overhead drag type conveyor system for providing a controlled and uniform discharge of particulate material along the full length of an elongated material collector comprising a pair of spaced side rails and a plurality of longitudinally extending elongated bottom panels extending longitudinally along the rails, said panels being arranged generally serially along the discharge station, the bottom panels being capable of individual lateral movement relative to the rails to adjustably define a series of individual discharge openings between the rails with longitudinally adjacent openings being transversely offset relative to each other and to said side rails, said discharge openings being of selected size, configuration and lateral location to effect longitudinal distribution of the particulate material and discharge thereof as a curtain along the length of the discharge station.

2. The discharge station of claim 1 including actuation means associated with each of said panels for laterally moving the panel relative to the side rails.

3. The discharge station of claim 2 wherein the actuation means includes at least two panel actuating drive members for each panel spaced along the panel for controllable lateral movement of opposite longitudinal ends of the panel.

4. The discharge station of claim 1 including a panel actuating drive member and a panel drive connector secured to each panel, said drive connector being operatively associated with the drive member for laterally moving the panel in response to operation of the drive member.

5. The discharge station of claim 4 wherein the drive member is a rotatable threaded member and the drive connector engages the thread for movement in response to rotation of the threaded member.

6. The discharge station of claim 1 including panel supporting means for moving the panels into and out of secure clamped engagement with the side rails.

7. The discharge station of claim 2 including panel supporting means for moving the panel into and out of secure clamped engagement with the side rails.

8. The discharge station of claim 1 wherein the panels have a longitudinally extending edge and wherein said edge defines the transverse size and shape of the discharge opening.

9. The discharge station of claim 7 wherein the panel comprises a pair of side by side plates movable laterally relative to each other to provide a discharge opening therebetweeen.

10. A method of controlling discharge flow from a discharge station for an overhead drag type conveyor system for particulate material to provide a controlled elongated discharge curtain of particulate material along the full length of a material receiving collector comprising the steps of providing a series of elongated discharge control panels along the bottom of the overhead drag conveyor within the discharge station, selectively laterally moving each panel to adjustably define a series of individual discharge openings of selected size and configuration and drawing the particulate material along the successive panels to effect controlled discharge of the particulate material substantially simultaneously through multiple discharge openings of the series to provide the elongated discharge curtain of material along the length of the collector.

11. The method of claim 10 including the steps of unclamping the panels prior to lateral movement thereof and reclaiming the panels after the selected discharge opening has been adjusted.

* * * * *